(No Model.) 2 Sheets—Sheet 2.

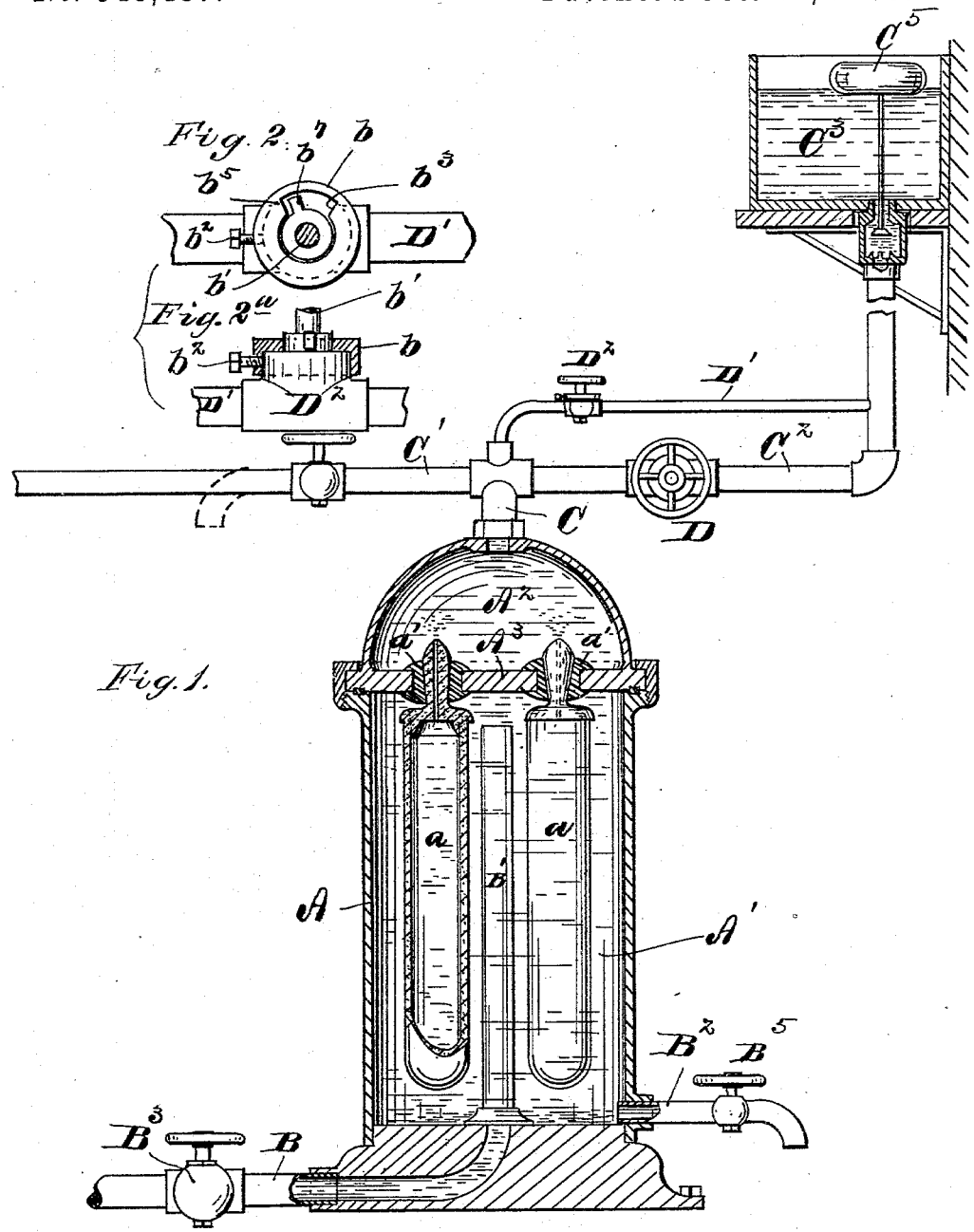

F. K. WAY.
FILTERING APPARATUS.

No. 548,487. Patented Oct. 22, 1895.

WITNESSES:
Chas. J. Welch
W. L. Wood

INVENTOR
Frank K. Way
BY
Staley & Shepherd
ATTORNEYS

UNITED STATES PATENT OFFICE.

FRANK K. WAY, OF DAYTON, OHIO, ASSIGNOR TO THE PASTEUR-CHAMBERLAND FILTER COMPANY, OF SAME PLACE.

FILTERING APPARATUS.

SPECIFICATION forming part of Letters Patent No. 548,487, dated October 22, 1895.

Application filed December 31, 1890. Serial No. 376,348. (No model.)

*To all whom it may concern:*

Be it known that I, FRANK K. WAY, a citizen of the United States, residing at Dayton, in the county of Montgomery and State of Ohio, have invented certain new and useful Improvements in Filtering Apparatus, of which the following is a specification.

My invention relates to improvements in filtering apparatus, and it especially relates to that class of filtering devices adapted to work under what is known as the "System Pasteur."

The object of my invention is to provide means for cleaning the filtering-tubes and carrying off the foreign substances accumulated in the casing surrounding said tubes without opening said casing or removing the tubes. I attain this object by the use of the apparatus set forth in the accompanying drawings, in which—

Figure 3:
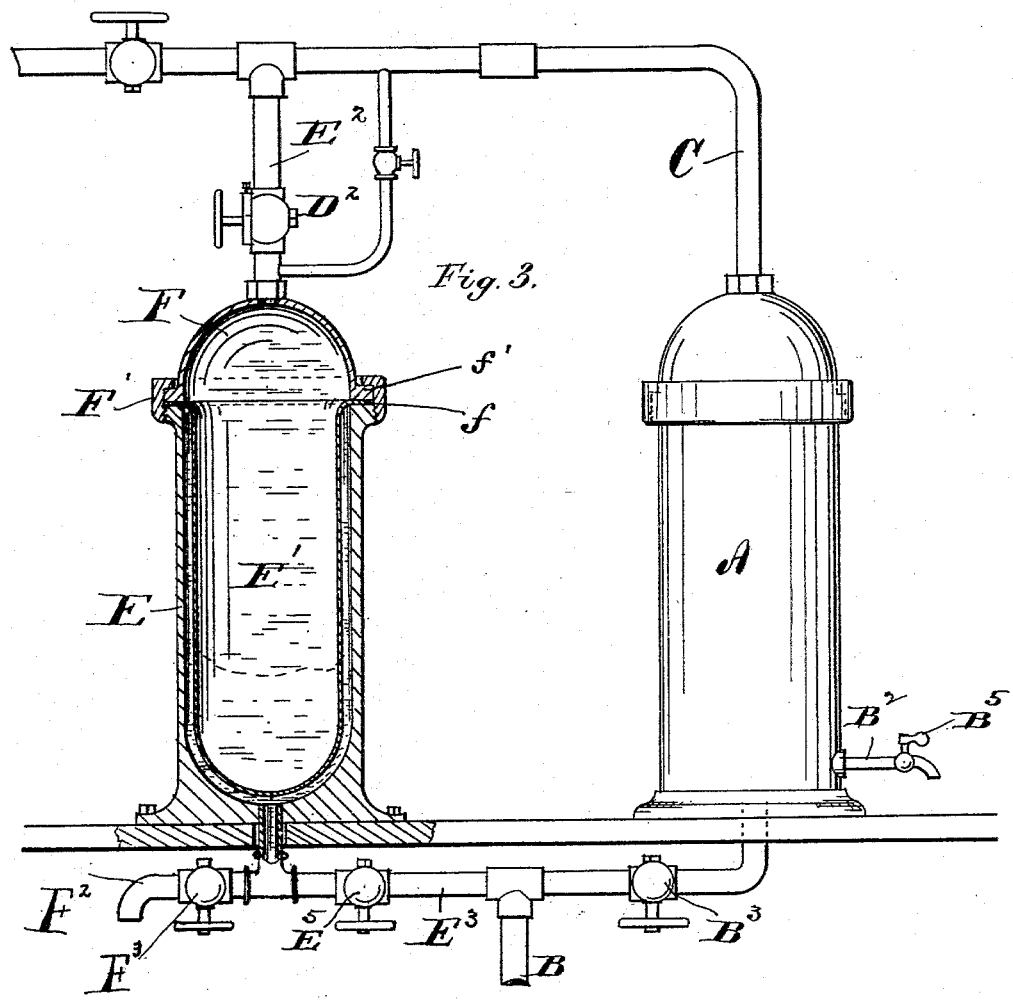
Figure 4:
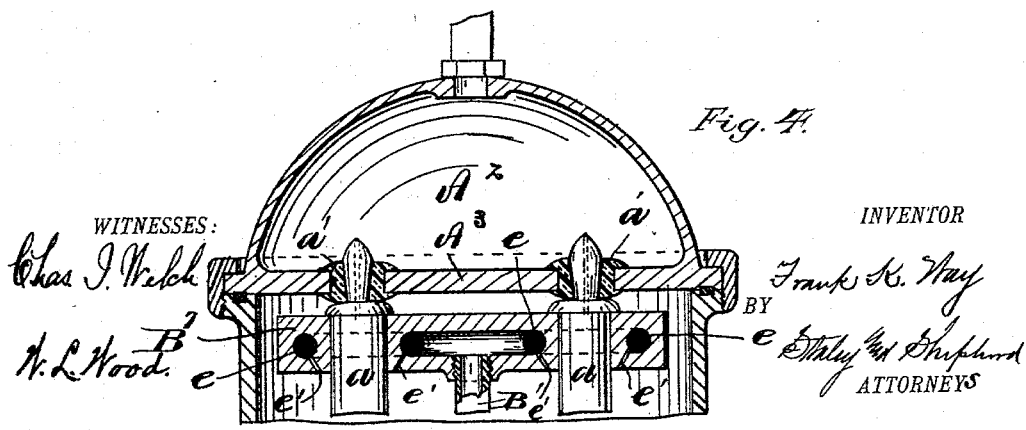

Figure 1 is an elevational view, partly in section, of a device embodying my invention. Figs. 2 and 2$^a$ are a plan and side view, respectively, of a set or stop valve forming part of the same, each of said views being partly in section. Fig. 3 is an elevation, also partly in section, showing a modification in the means for obtaining a head or back pressure in the operation of the device. Fig. 4 is a modification of the interior construction of the filtering apparatus to be used in connection with the tubes for cleaning.

Like parts are indicated by similar letters of reference throughout the several views.

In the said drawings, A represents an ordinary "Pasteur" filter containing any suitable number of filtering-tubes $a$. These tube are located in a compartment A' and adapted to discharge into another compartment A$^2$ through a plate or diaphragm A$^3$, the tubes being supported in said plate or diaphragm preferably by means of rubber retaining-washers $a'$ in the manner set forth in my previous patent, No. 395,333, dated June 26, 1888.

The water or other liquid is supplied to the filter A through a supply-pipe B from a city main or from any other convenient source of supply having a sufficient head or pressure. It enters the casing A', and, passing through the walls of the tubes $a$, is discharged into the compartment A$^2$, and thence through a suitable pipe C to any desirable point where the water is to be used. The pipe C is preferably extended in two branches C' C$^2$, one of which is connected to a reservoir C$^3$, located at a suitable height to secure a head or back pressure in the filtering-chamber. This pipe C$^2$ is provided with a stop-valve D, preferably near the filter, around which is extended a small pipe or by-pass D', having therein a set or stop valve D$^2$. A suitable float-valve C$^5$ is also preferably provided at the reservoir adapted to close when the water has risen to a sufficient height in said reservoir.

The set or stop valve D$^2$, as shown in detail in Figs. 2 and 2$^a$, consists of a straightway-valve having a loose collar $b$ on the casing about the stem $b'$, said collar being adapted to be held in any desired position of adjustment around said stem by a set-screw $b^2$, and having therein stop-faces $b^3$ $b^5$, adapted to be engaged by a stop pin or projection $b^7$ on the stem $b'$, and thus limit the movement of said stem in either direction. This construction permits the valve to be so adjusted that it can be opened to a limited extent only, the amount of opening depending upon the adjustment of the collar $b$ about the outer casing of the valve, the object of this adjustment being to limit the amount of liquid which can pass through the valve at a given time and thus regulate the supply through said valve to correspond to the head and the capacity of the filter, as hereinafter more fully described.

The supply-pipe B is connected to the base of the filter, so that the liquid entering the same is discharged into the filtering-compartment A' through a stand-pipe B', which projects upwardly within said compartment A' to within a short distance of the diaphragm or plate A$^3$. A waste or discharge pipe B$^2$ is also provided, which leads from the bottom of the filtering-compartment A', the supply-pipe B and discharge-pipe B$^2$ being each provided with suitable stop-valves B$^3$ B$^5$.

The operation of the device as thus described is as follows: The discharge pipe B$^2$ being closed water or other liquid to be filtered is introduced through the supply-pipe B under pressure. The compartment A' being filled the liquid is forced through the tubes $a$ into the chamber or compartment A$^2$ and thence into the reservoir C³ through the pipe C², the valve D being open. It being desirable to clean the filter the valve B³ in the supply-pipe B is closed, as is also the valve D in the reservoir-pipe C², the by-pass D' being left open through the stop-valve D². The discharge-pipe B² is now opened and the liquid and foreign substances collected in the filtering-chamber permitted to escape. The chamber A' being thus empty the pressure or head formed in the reservoir C³ forces the filtered or purified liquid back through the tubes $a$ in the opposite direction from that in which the filtering takes place, thus loosening any particles of foreign matter which collect on the outer surface of the tubes, the stop-valve D² being so adjusted as to regulate the quantity of liquid which is admitted to the filter to correspond to the head in the reservoir C³ and the capacity of the filter to prevent the tubes from being broken at a too great inward pressure or from being displaced through the washers $a'$ in the diaphragm A³. The foreign matter on the surface of the tubes being thus loosened the supply-pipe B is opened and the water or other material rushes into the outer casing and against the diaphragm A³, from whence it is deflected and passes down along the outside of the tubes $a$, thoroughly washing the same and carrying the foreign matter through the discharge-pipe B².

In Fig. 3 I have shown the device modified so far as obtaining the pressure or head is concerned. Instead of the reservoir C³, I employ an outer casing E, which may be located on the same level with the filter A, this casing E being provided with an inner compartment E', formed of rubber or other flexible material and adapted to extend downwardly into the casing E, but having no communication with the same. A pipe E² connects the inner chamber E' with the filter, said pipe being provided with the set cock or valve D², as before described, the outer casing E being connected to the supply-pipe B by a suitable pipe E³, having a stop-valve E⁵.

In the operation of the device as thus embodied the inner flexible compartment E' is filled with filtered or purified liquid from the filter A through the pipe E². When it is desired to clean the filter, this purified or filtered liquid is forced through the filter by utilizing the pressure from the supply-pipe B in the outer casing E, thus compressing the flexible compartment E' and forcing the liquid from the same back through the filter in the manner as before described, the stop or set valve D² being adapted to limit the quantity which passes through the same to correspond to the capacity of the filter and the pressure in the supply-pipe.

In Fig. 4 I have shown a modification in the arrangement of the supply-pipe and the stand-pipe through which the filter is supplied. In this case the stand-pipe B' is connected at the top to a hollow or chambered plate B⁷, having suitable openings through which the tubes $a$ are adapted to pass, said openings being surrounded with chambers or passages $e$, having discharge-openings $e'$ leading therefrom at an angle to the tubes $a$, so that the liquid from the stand-pipe B' is discharged in a series of small jets against the peripheries of each of the tubes, so as to secure a thorough washing for the same by the entrance of the water or other liquid through said stand-pipe when the filtering-chamber A is emptied.

The inner flexible receptacle E' of the pressure device shown in Fig. 3 consists, preferably, of a bag-shaped receptacle having an annular flange $f$ at the top, adapted to project over and rest on the top of the outer casing E, the flexible receptacle being held in this position by means of a cap F, which rests on the flange $f$ and answers for a top for the receptacle E', the parts being held together by a clamp-ring F', which operates against an annular flange $f'$ on the cap F. A discharge-pipe F², having a stop-valve F³, is also provided from the outer casing E to permit the same to be emptied, so that the flexible receptacle E' may expand within said outer casing, so as to receive and retain sufficient filtered liquid to produce the preliminary operation of cleaning, as before described.

The set or stop cock D² is adjusted to the capacity of the filter and the conditions under which it is to operate when the filter is set up, after which it need not be changed. In the operation of washing the filter this valve is opened as far as the stop projection will permit it, and thus secures the passage of just enough liquid through the same to accomplish the object of loosening the foreign substances from the tubes without endangering said tubes or dislocating the same. It is evident that the same result may be accomplished with any ordinary valve or cock, provided the same is skillfully operated so as to regulate the backward flow of liquid to the filter to the capacity of the filter and the back-pressure therein, but the set-valve cannot be improperly operated without changing the set-collar.

The filter as thus described may be located at any convenient point and may furnish the water or other liquid to be filtered at any other convenient point. By the arrangement as shown in Fig. 1 a filter of sufficient capacity to furnish a house may be located in the cellar, while the reservoir may be located on one of the upper floors, the reservoir serving the double purpose of cleaning in the manner described and of furnishing a supply of water greater than the capacity of the filter in a given time. The arrangement of the reservoir, however, and the other details of construction would be variously modified to suit the circumstances and conditions under which the filter was adapted to operate.

It is obvious that other modifications of the device may be employed without departing from the spirit of my invention. I do not, therefore, limit myself to the exact constructions shown and described; but

I claim as my invention—

1. The combination of a filter having a filtering chamber, a supply pipe leading to said filtering chamber, and a waste or discharge pipe from said filtering chamber, a reservoir connected to said filtering chamber through a filtering medium, and a movable part in said reservoir adapted to discharge the filtered water therefrom, said movable part being operated by the pressure of the water from the supply pipe, substantially as specified.

2. The combination with a filter having a filtering chamber, and a reservoir connected with said filtering chamber through a filtering medium, said reservoir being formed of two parts, one part being adapted to receive the filtered water and the other connected to the supply pipe so as to receive the pressure of said supply pipe whereby the pressure of the supply pipe may be used for causing a backward filtration of filtered water through said filtering medium, substantially as specified.

3. The combination with a filter having a supply pipe and a filtering chamber, a two-part reservoir, one part of said reservoir being connected to the filter so as to receive the filtered water therefrom, the other part being connected to the supply pipe of said filter so as to receive the pressure of said supply pipe, valves for controlling said connections, and means as described for controlling the backward flow of the filtered water from said reservoir when forced by the pressure from the supply pipe, substantially as specified.

4. The combination with a filter having a filtering chamber, and a reservoir having two compartments, one to receive the filtered water and the other connected to the supply pipe which supplies said filter, means in said reservoir whereby the pressure in one of said reservoir compartments is communicated to the other, a discharge pipe leading from said filtering chamber, and valves for said pipe connections whereby by admitting the water from the supply pipe into one portion of said reservoir the filtered water is forced backward through said filter by the pressure of the water supply, substantially as specified.

5. The combination with a filter having a filtering chamber and filtering tubes therein, a reservoir connected to said filter so as to receive the filtrate therefrom, a waste or discharge pipe from said filtering chamber, a supply pipe for said filter, and a branch pipe leading from said supply pipe to a cylinder or casing, and means for applying the pressure of said water supply to the filtered water in said reservoir whereby a backward filtration may be obtained by the pressure of the water supply, substantially as specified.

6. The combination with a filter having a filtering chamber, a supply pipe leading to said filtering chamber, and a waste or discharge pipe leading from said filtering chamber, a reservoir connected to the filtering chamber through a filtering medium, the liquid from said reservoir being supplied with sufficient pressure to discharge itself backward through said filtering medium when the waste pipe is opened, a valve in the pipe which connects said filter to said reservoir, and a by-pass having a contracted opening leading around said valve, substantially as specified.

7. The combination with a filter, of a reservoir connected with said filter so as to receive a portion of the filtrate therefrom, a connection from the water supply to said reservoir, and means as described whereby the pressure from said water supply may be utilized for causing a backward filtration through the filtering medium, substantially as specified.

In testimony whereof I have hereunto set my hand this 11th day of December, A. D. 1890.

FRANK K. WAY.

Witnesses:
WEBSTER W. SHUEY,
CHARLES H. BOSLER.